United States Patent [19]
Rajashekara et al.

[11] Patent Number: 5,717,584
[45] Date of Patent: Feb. 10, 1998

[54] QUASI-RESONANT POLE INVERTER

[75] Inventors: Kaushik Rajashekara, Carmel, Ind.; Venkatachari Rajagopalan, Trois-Rivieres, Canada

[73] Assignee: General Motors Corporation, Detroit, Mich.

[21] Appl. No.: 569,856

[22] Filed: Dec. 8, 1995

[51] Int. Cl.[6] ................................................. H02M 3/24
[52] U.S. Cl. ........................ 363/98; 363/132; 363/71; 363/56; 363/41
[58] Field of Search ..................... 363/37, 41, 95, 363/97, 98, 131, 132, 56, 71; 318/800, 801, 803

[56] References Cited

U.S. PATENT DOCUMENTS

| | | | |
|---|---|---|---|
| 4,730,242 | 3/1988 | Divan | 363/37 |
| 4,870,555 | 9/1989 | White | 363/21 |
| 5,111,374 | 5/1992 | Lai et al. | 363/37 |
| 5,172,309 | 12/1992 | DeDoncker et al. | 363/132 |
| 5,303,138 | 4/1994 | Rozman | 363/21 |

OTHER PUBLICATIONS

"Improvements On Zero–Voltage Transition Three–Phase Rectifier/Inverter" Hengchun Mao and Fred C. Lee, 1995 VPEC Seminar, pp. 19–27.

R. W. DeDoncker and J.P. Lyons, "The Auxiliary Resonant Commutated Pole Converter", IEEE IAS Annual Meeting Record, 1990, 90Ch2935-5, pp. 1228–1235.

D.M.Divan, "The Resonant DC Link converter—A New Concept In Static Power Conversion":, IEEE–IAS Annual Meeting Record, 1986, 86CH2272-3, pp. 648–656.

*Primary Examiner*—Peter S. Wong
*Assistant Examiner*—Shawn Riley
*Attorney, Agent, or Firm*—Vincent A. Cichosz

[57] ABSTRACT

A quasi-resonant pole inverter provides soft-switching of the main inverter switch devices only when such opportunities are required by the pulse width modulation control. The inverter includes a main switching section and an auxiliary switching section. A phase-pole of the main switching section swings from source to ground potential with the assistance of the auxiliary switching section. The phase-pole swings from ground to source potential with the assistance of the auxiliary switching section. Low switch stresses are characteristic in both the main switching section devices and the auxiliary section switching devices. Main power is carried predominantly through the DC rails thereby minimizing power handling requirements of quasi-resonant reactive components.

6 Claims, 6 Drawing Sheets

QUASI-RESONANT POLE INVERTER

BACKGROUND

The present invention relates to soft-commutated inverters. More particularly, the invention is concerned with a quasi-resonant pole topology for providing soft switching of inverter switch devices.

Several types and variations of DC link topologies are known. For example, resonant DC links (RDCL) are known which provide zero voltage switching opportunities for the inverter devices. Such topologies provide for soft switching by supplying a continually resonating DC bus voltage. However, such topologies exhibit undesirable characteristics of elevated voltage stresses in the inverter devices of up to approximately two times the unit input voltage of the DC link. This is due to the peak voltages of the resonating DC link of up to approximately two times the unit input voltage of the DC Link. Another topology, the actively clamped resonant DC link (ACRDCL), may reduce these stresses to approximately 1.4 to 1.7 times the unit input voltage but requires a clamping device operative at the resonant frequency—typically an order of magnitude greater than the inverter switching frequency—thereby resulting in significant switching losses. In either the RDCL or ACDCRL topology, a resonant inductor element is required to carry the full load current resulting in massive hardware particularly in high power applications. Furthermore, since the inverter devices switch substantially synchronously with the resonating DC bus, the output of the RDCL or ACRDCL inverter will be an integral multiple of the DC bus pulses thereby limiting current control precision available from such a topology.

Yet another DC link topology includes an auxiliary quasi-resonant DC link (AQRDCL). While certain drawbacks (e.g. high voltage stresses on inverter devices and continuous pulsing DC bus) of the previously mentioned topologies are solved by the AQRDCL topology, such a topology suffers from some characteristic drawbacks. For example, trade-offs among the necessity of maintaining charge balance between DC bus capacitors, minimizing DC bus clamping time and managing current stress on upper clamping devices, especially at low link currents are inevitable unless a split DC input voltage supplies the DC link. It is also necessary that the controller anticipate the future link current after the inverter devices undergo a state change, resulting in additional control complexity. Furthermore, regenerative operation of such topology generally is not considered practical owing to the complexity of associated control.

SUMMARY

An inverter in accordance with the present invention is characterized by a DC source having a positive DC rail and a negative DC rail at the input and a multi-phase AC output. Each phase-pole of the output is controlled to one of substantially the positive DC rail voltage or substantially the negative DC rail voltage in accordance with a pulse width modulation control. The inverter includes a main switching section and an auxiliary switching section. The auxiliary switching section is used to control forced quasi-resonance of the individual phase-poles in preparation for soft commutation of corresponding main switch elements.

In accordance with a preferred embodiment of the present invention, the auxiliary section includes one pair of auxiliary switch devices coupled in series with each other between the positive and negative DC rails. Each auxiliary switch device includes a respective solid state controlled switch element and anti-parallel diode coupled thereacross. A respective series coupled inductor and capacitor (series LC) is coupled at one end thereof to the node, or auxiliary pole, between the auxiliary switch devices and at the other end thereof to the node, or main phase-pole, between a respective phase-pair of main switch devices.

In accordance with another preferred embodiment of the present invention, the auxiliary section includes a plurality of phase-pairs of auxiliary switch devices, each switch device of each phase-pair being coupled in series with the other between the positive and negative DC rails. Each auxiliary switch device includes a respective solid state controlled switch element and anti-parallel diode coupled thereacross. A respective series coupled inductor and capacitor (series LC) is coupled at one end thereof to the node, or auxiliary phase-pole, between a respective phase-pair of auxiliary switch devices, and at the other end thereof to the node, or main phase-pole, between a respective phase-pair of main switch devices.

In accordance with one aspect of the invention, commutation of a phase-pair of main switch devices is carried out by resonating the corresponding pole from a first voltage level to a second voltage level and passively clamping the main phase-pole voltage via the anti-parallel diode coupled between the main phase-pole and second voltage level. Commutation of the lower main switching element is then performed at zero current and zero voltage conditions.

In accordance with another aspect of the invention, commutation of a phase-pair of main switch devices is carried out by resonating the corresponding pole from the second voltage level to the first voltage level and passively clamping the main phase-pole voltage via the anti-parallel diode coupled between the main phase-pole and first voltage level. Commutation of the upper main switching element is then performed at zero current and zero voltage conditions.

DETAILED DESCRIPTION OF THE DRAWINGS

Figure 1:
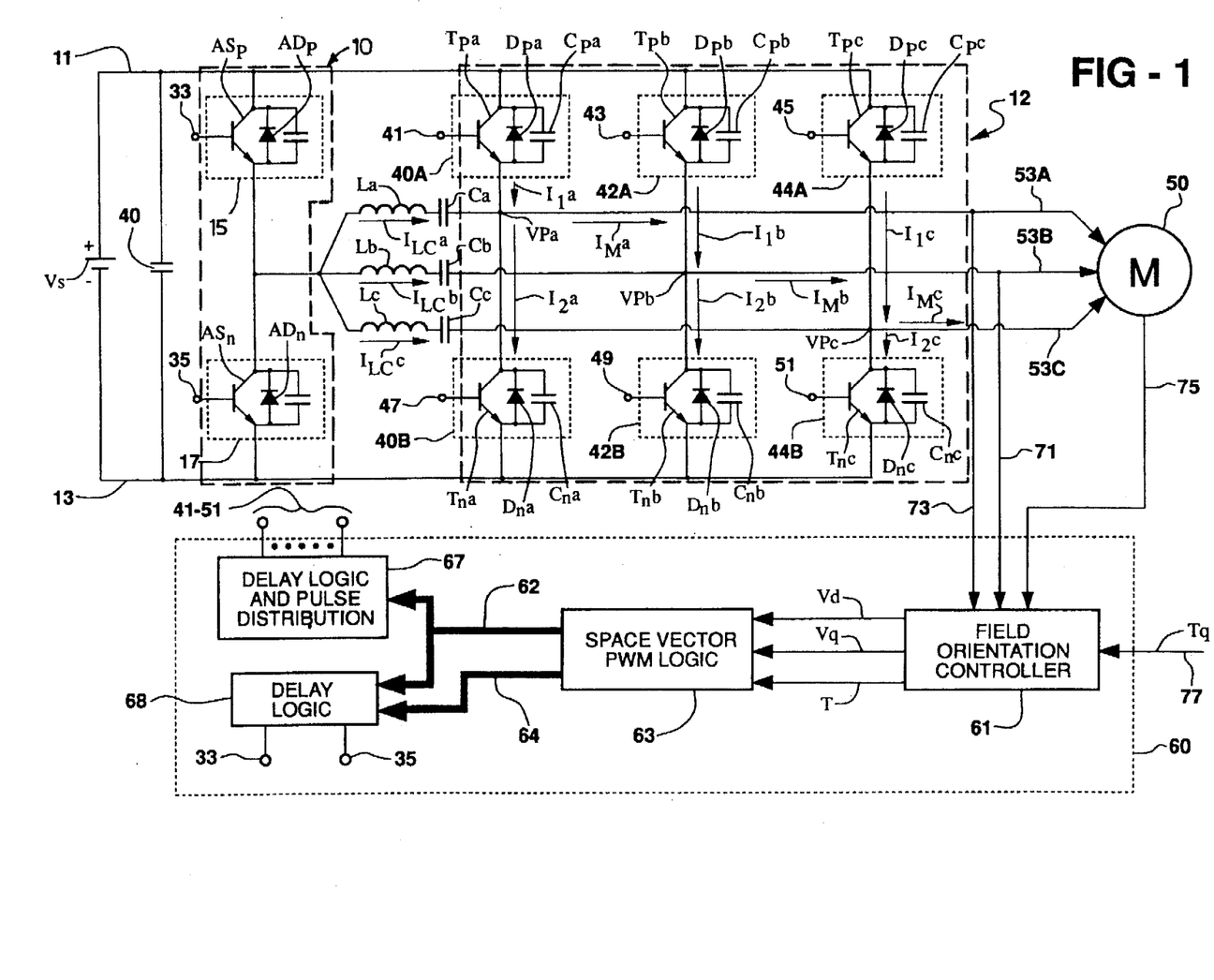
FIG. 1 illustrates schematically a first embodiment of a soft-commutated PWM inverter according to the present invention.

Beginning first with FIG. 1, a first embodiment of an inverter in accordance with the present invention is illustrated coupled at its output to supply a multi-phase AC load. The load shown associated with the inverter in the present embodiment is a three-phase motor 50 such as a three phase AC induction machine having application, for example, as a motive drive in an electric or hybrid road vehicle. Of course, the load is offered by way of example and not of limitation, it being understood that the number of phases of the load will correspond to the number of phases of the multi-phase inverter. Also, an AC induction machine is an exemplary load, it further being understood that other multi-phase load applications, for example permanent magnet motors, are within the scope of application of the present invention.

Numeral 10 generally designates an auxiliary switching section between DC source voltage Vs and main switching section generally designated 12. DC source voltage Vs may be for example a rectified AC line voltage or a pure DC source voltage such as is available through a battery pack. Source capacitor 40 is illustrated between the positive DC rail 11 and negative DC rail 13 and serves to ensure the power quality between the positive DC rail and negative DC rail.

Auxiliary switching section 10 comprises a pair of auxiliary switch devices 15 and 17 shown connected in series with each other between the positive DC rail 11 and the negative DC rail 13. Auxiliary switch devices 15 and 17 comprise respective ones of solid state auxiliary switch elements $AS_p$ and $AS_n$ paired with a respective anti-parallel auxiliary diodes $AD_p$ and $AD_n$. Each combined auxiliary switch element and anti-parallel diode are found in conventional IGBT power switch devices or may be fabricated of individual elements as appropriate. Appropriate gate drive signals are applied to gates of the auxiliary switch devices 15 and 17 at 33 and 35, respectively. The subscripts 'p' and 'n' are used herein to designate relative coupling position of the auxiliary switch device components as between the positive rail 'p' and negative rail 'n'. The auxiliary switch devices directly coupled to the positive DC rail are referred to as upper switch devices while the switch devices directly coupled to the negative DC rail are referred to as lower switch devices. The node between the upper and lower auxiliary switch devices is referred to as the auxiliary pole.

Main switching section 12 comprises a plurality of main switch devices individually labeled 40A, 40B, 42A, 42B, 44A, and 44B. A three-phase inverter is exemplary, it being understood that the present invention is equally applicable to any multi-phase inverter. Each main switch device comprises a respective solid state switching element ($T_p a$, $T_p b$, $T_p c$, $T_n a$, $T_n b$, $T_n c$), anti-parallel diode ($D_p a$, $D_p b$, $D_p c$, $D_n a$, $D_n b$, $D_n c$), and capacitor ($C_p a$, $C_p b$, $C_p c$, $C_n a$, $C_n b$, $C_n c$). The switching element and diode of each main switch device are preferably packaged together as previously described with respect to the auxiliary switch devices. Preferably, capacitors are substantially equivalent. As with the auxiliary switch devices, The subscripts 'p' and 'n' are used herein to designate relative coupling position of the main switch device components, 'p' designating the components coupled directly to the positive rail and 'n' designating the components coupled directly to the negative rail. Furthermore, an alphabetic suffix (a, b, or c) is used herein to designate the particular output phase associated with the particular component to which it is assigned. The switch devices directly coupled to the positive DC rail are referred to as upper switch devices while the switch devices directly coupled to the negative DC rail are referred to as lower switch devices. The nodes between respective phase-pairs of main switch devices, or main phase-poles, are coupled to one end of a respective resonant capacitor (Ca, Cb, Cc), the other end of the respective resonant capacitor being coupled to one end of a respective resonant inductor (La, Lb, Lc). The other ends of the resonant inductors are coupled to the node between the auxiliary switch devices 15 and 17. Together, each series coupled resonant inductor/resonant capacitor pair (La-Ca, Lb-Cb, Lc-Cc) may be referred to hereafter as a series LC.

Moving from left to right in FIG. 1 as it corresponds to main switching section 12, a phase-pair of main switch devices 40A and 40B are associated with output phase 'a', a phase-pair of main switch devices 42A and 42B are associated with output phase 'b', and a phase-pair of main switch devices 44A and 44B are associated with output phase 'c'. Appropriate gate drive signals are applied to gates of the switching elements at 41, 43, 45, 47, 49 and 51. Phase outputs for supplying a load are provided by lines labeled 53a, 53b, and 53c, the alphabetic suffix corresponding to the particular output phase associated therewith. The pole voltages labeled VPa, VPb, VPc between respective phase-pairs of main switch devices relative to negative DC rail 13 establish the stator field of motor 50.

Numeral 60 in FIG. 1 illustrates generally a control for the auxiliary and main switch devices. In operation, the control 60 is required to establish a rotating magnetic field in the stator of the machine 50. It is most desirable that the current supplied to the stator windings is substantially sinusoidal, and a preferred manner of accomplishing this goal is to pulse width modulate the inverter switches at a relatively high frequency (such as 20 kHz). Controller 60 is preferably a microprocessor based controller in which the inverter conduction patterns are stored in nonvolatile memory. An exemplary digital control for inverter conduction patterning is shown in U.S. Pat. No. 5,317,248 to Utley et al. and assigned to the assignee of the present invention. It is noted, however, that the precise inverter control will vary with type of load and application and any inverter control may be utilized in conjunction with the present invention.

Blocks 61–68 are representative of functional blocks of logic processing for establishing both the inverter gate drive signals at 41–51 as well as the auxiliary switch element gate drive signals at 33 and 35 in accordance with the present invention. Inputs to controller 60 include at least two phase reference signals, lines 71 and 73, which in the present embodiment are illustrated as current sense signals derived from legs 53a and 53b of the inverter outputs by well known current sensors. Additionally, a rotor angle signal on line 75 is derived from a conventional encoder (not shown) which would be mechanically coupled to the rotor in the motor to thereby provide periodic electric pulses on line 75 at a frequency based on rotor displacement. The inverter output amplitude is determined in response to a demand signal such as a torque command signal on line 77 illustrated at the right of controller 60. The torque command signal may be derived for example from an operator input such as through an accelerator pedal position in a well known manner. The stator angle is determined as a combined function of the rotor position information provided by the encoder on line 75 and a desired slip of the machine. The magnitude of the slip may be fixed, while its sign depends on whether the machine is operating as a motor or a generator.

Block 61 represents motor/generator logic which determines whether the machine 50 should be operating in the motoring or generating mode. In an automotive installation, this may be determined by monitoring the vehicle acceleration or application of the service brakes. The block 61 further determines the amplitude and slip commands, which amplitude is directly related to the demand signal input on line 77 while the slip command may be fixed or determined in relation to the required torque or the desired power output of the machine 50. The outputs from block 61 labeled Vd, Vq and T are representative of reference signals for a direct axis voltage, quadrature axis voltage and timing, respectively, which together fully define the phase angle and magnitude of the rotating field in the present implementation.

Block 63 is representative of, preferably, space vector pulse width modulation logic for generating PWM signals in accordance with the direct and quadrature axis voltage signals and angle signal. In the present exemplary embodiment of FIG. 1, space vector PWM control is preferred because this control makes a single transition at any given commutation of the switches thereby ensuring minimum switching transitions. Preferably, space vector PWM logic 63 comprises any well known commercially available programmable logic devices, such as ADMC 200 available from Analog Devices. Alternatively, other conventional PWM modulation techniques may be employed, the precise PWM logic utilized not being critical to the present invention, there being many well known techniques for generating the desired output through PWM control. It is here noted, however, that a true PWM control advantageously may be implemented herein, the present invention not restrictive of the PWM waveform generation at least within the physical response and recovery times of the auxiliary switch devices as discussed later. The output of block 63 is represented by the PWM signals 62 and commutation signals 64.

The PWM signals 62 are illustrated as inputs to blocks 67 and 68. Block 67 which functions to apply the PWM signals as gate drive signals to the appropriate main switch elements 40A–44B vis-a-vis output lines 41–51 as illustrated. Block 67 is also representative of an array of output drivers and associated buffer circuitry as is well known in the art to provide appropriate gate drive signals from the PWM logic signals. In addition to the distribution of the PWM signals as gate drives, block 67 applies appropriate delay to prevent undesirable simultaneous commutation of both ones of a phase-pair of main switch elements, for example $T_p a$ and $T_n a$, to prevent shorting of the positive and negative DC rails.

The commutation signals 64 are illustrated as another set of inputs to the delay logic block 68 which functions to ensure that the commutation of both the auxiliary switch elements does not occur simultaneously and to ensure that any resonant cycles induced for the commutation of a main switch element by the commutation of an auxiliary switch element is allocated sufficient duration for completion before another such resonant cycle is induced by the same auxiliary switch element for the commutation of another main switch element.

Figure 2A:
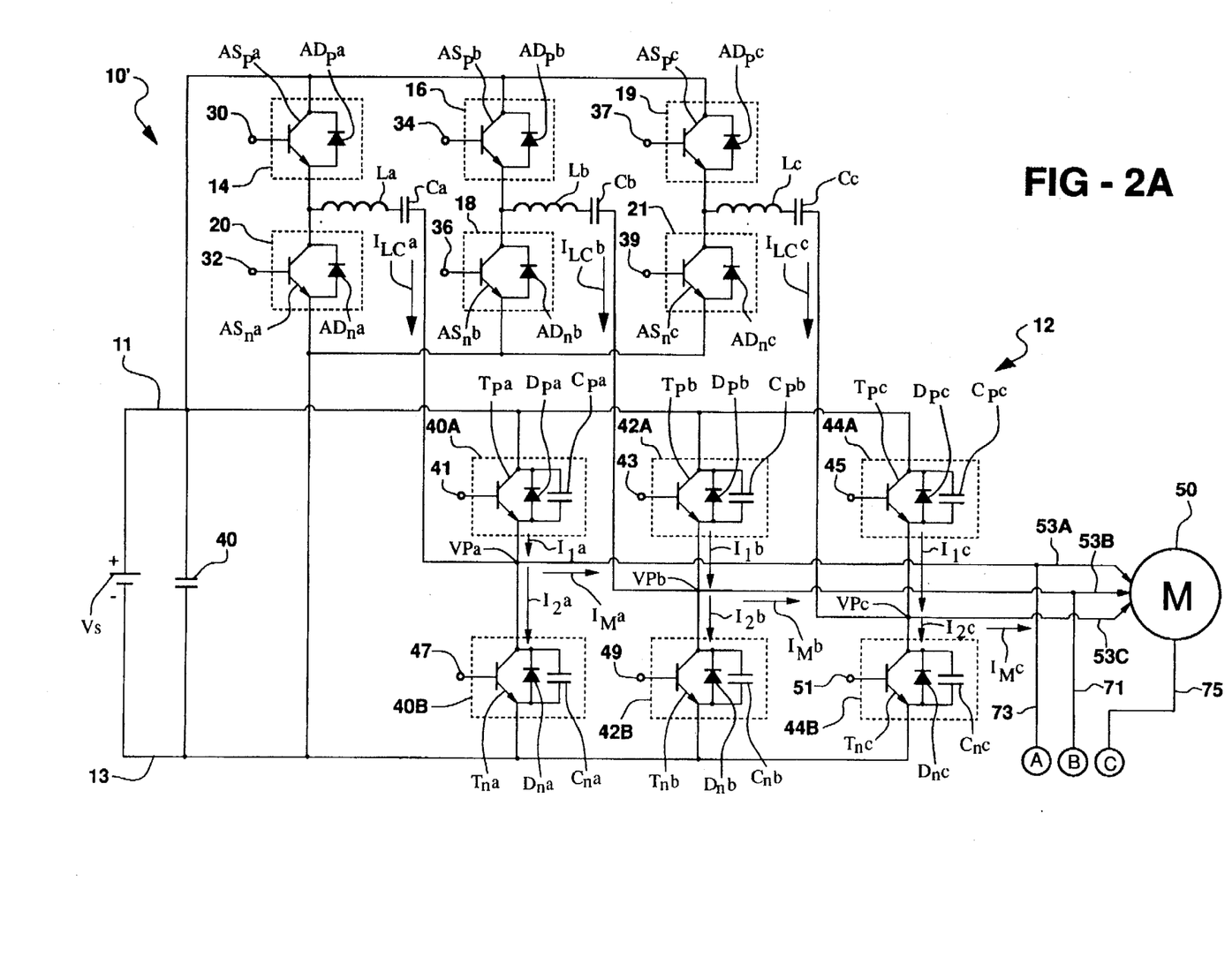
FIGS. 2A and 2B illustrate schematically a second embodiment of a soft-commutated PWM inverter according to the present invention.
Figure 2B:
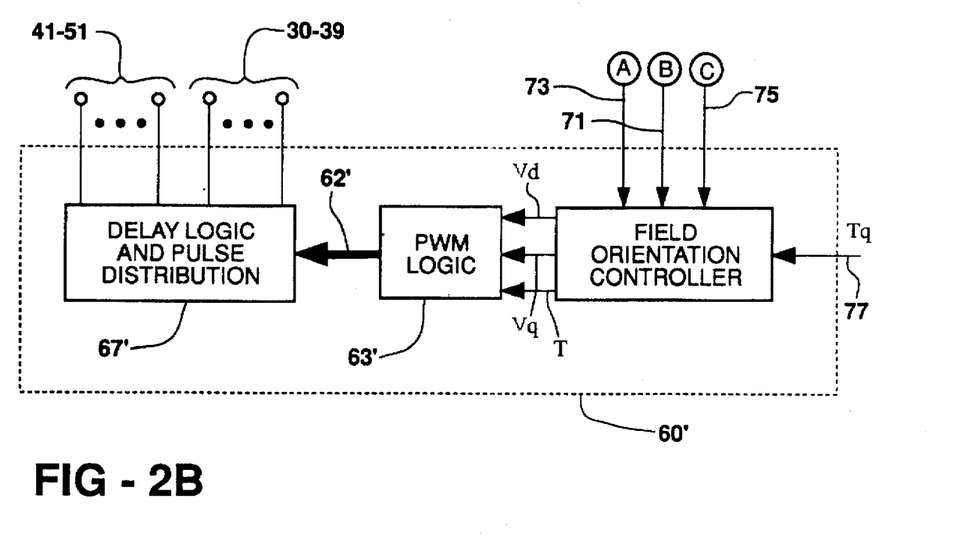

Turning now to FIG. 2, a second embodiment of an inverter in accordance with the present invention is illustrated. Features of the embodiment of FIG. 2 that are identical to those of the embodiment of FIG. 1 are designated with identical numerals and letters. Identical features are herein considered as fully described for either embodiment when described with respect to one embodiment. Therefore, certain features common among the various embodiments may not be redundantly described herein.

Numeral 10' generally designates an auxiliary switching section between DC source voltage Vs and main switching section 12. Auxiliary switching section 10' comprises a plurality of phase-pairs of auxiliary switch devices, each respective phase-pair shown connected between the positive DC rail 11 and the negative DC rail 13. Auxiliary switch devices 14 and 20 comprise respective ones of solid state auxiliary switch elements $AS_p a$ and $AS_n a$ paired with a respective anti-parallel auxiliary diodes $AD_p a$ and $AD_n a$. Appropriate gate drive signals are applied to gates of the auxiliary switch devices 14 and 20 at 30 and 32, respectively. All other such phase-pairs of auxiliary switch devices (16,18 and 19,21) comprise similar solid state auxiliary switch elements ($AS_p b$, $AS_n b$ and $AS_p c$, $AS_n c$), anti-parallel auxiliary diodes ($AD_p b$, $AD_n b$, $AD_p c$, $AD_n c$) and gate terminals (34,36 and 37,39), respectively. The subscripts 'p' and 'n' designate relative coupling position of the auxiliary switch device components as between the positive rail 'p' and negative rail 'n'; and an alphabetic suffix (a, b, or c) designates the particular output phase associated with the particular component to which it is assigned. The auxiliary switch devices directly coupled to the positive DC rail are referred to as upper switch devices while the switch devices directly coupled to the negative DC rail are referred to as lower switch devices. The respective nodes between an upper and lower auxiliary switch device are referred to as the auxiliary phase-pole.

With reference to the main switching section 12, the nodes between respective phase-pairs of main switch devices are coupled to one end of a respective resonant capacitor (Ca, Cb, Cc), the other end of the respective resonant capacitor being coupled to one end of a respective resonant inductor (La, Lb, Lc). The other end of each respective resonant inductor is coupled to a respective auxiliary phase-pole between a respective phase-pair of auxiliary switch devices.

Numeral 60' in FIG. 2 illustrates generally a control for the auxiliary and main switch devices. In operation, the control 60' is required to establish a rotating magnetic field via the inverter as described with reference to FIG. 1. Blocks 63' and 67' are representative of functional blocks of logic processing for establishing both the inverter gate drive signals at 41–51 as well as the auxiliary switch element gate drive signals at 30–39 in accordance with the present invention Block 63' is representative of pulse width modulation logic for generating PWM signals in accordance with the direct and quadrature axis voltage signals and angle signal. In the present exemplary embodiment of FIG. 2, conventional PWM modulation techniques may be employed, the precise PWM logic utilized not being critical to the present invention, there being many well known techniques for generating the desired output through PWM control. It is here noted, however, that in contrast to the embodiment of FIG. 1, the present embodiment is not restricted by physical response and recovery times of a single pair of auxiliary switch devices. Rather, faster switching rates may be available through the plurality of phase-pairs of auxiliary switch devices. The output of block 63 is represented by the PWM signals so labeled.

The PWM signals 62' are illustrated as inputs to block 67' which functions to apply the PWM signals as gate drive signals to the appropriate main switch elements 40A–44B vis-a-vis output lines 41–51 as illustrated. Block 67' is also representative of an array of output drivers and associated buffer circuitry as is well known in the art to provide appropriate gate drive signals from the PWM logic signals. In addition to the distribution of the PWM signals as gate drives, block 67' applies appropriate delay to prevent undesirable simultaneous commutation of both ones of a phase-pair of main switch elements, for example $T_p a$ and $T_n a$, to prevent shorting of the positive and negative DC rails, and to ensure that the commutation of respective upper and lower auxiliary switch elements of a phase-pair of auxiliary switch elements does not occur simultaneously.

Figure 3:
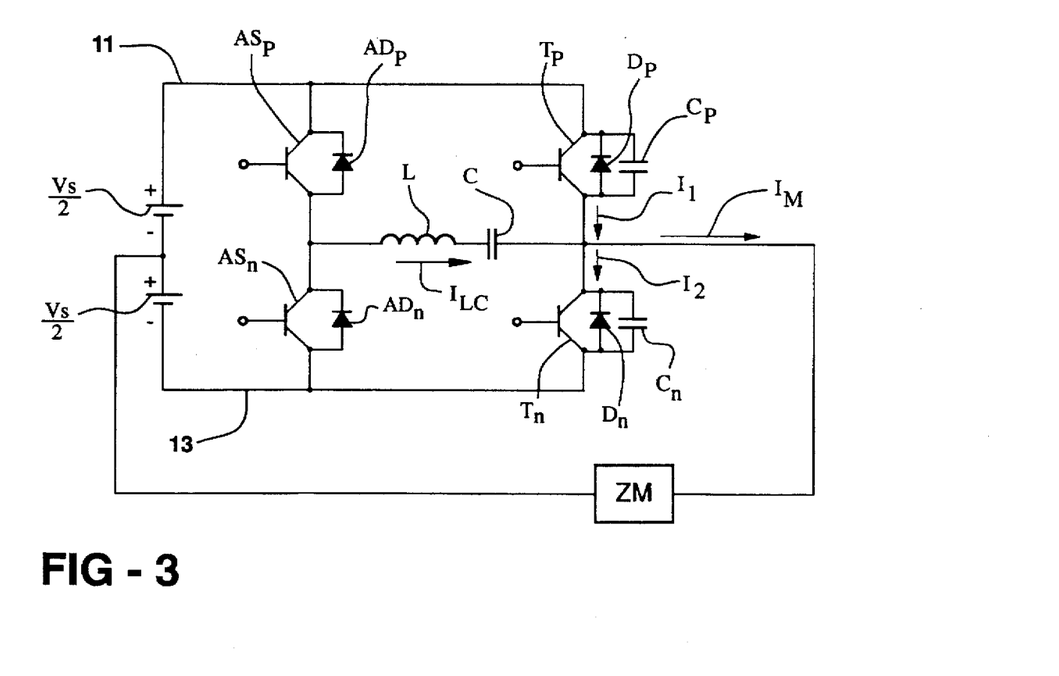
FIG. 3 illustrates a single phase of a soft-commutated inverter in accordance with the present invention.

FIG. 3 is illustrative of a single phase-pair of main devices, associated pair of auxiliary devices and respective series LC for either of the embodiments shown in and described with respect to FIGS. 1 and 2. Labels, including primed designations, correspond to similar labels in FIGS. 1 and 2. In the case of the embodiment of FIG. 2 wherein a phase-pair of auxiliary switch devices is associated with each phase-pair of main switch devices, the alphabetic phase designations a, b, and c have been dropped from both the auxiliary and main sections to arrive at FIG. 3. In the case of the embodiment of FIG. 1 wherein a single pair of auxiliary switch device services all of the phase-pairs of main switch device, the alphabetic phase designations a, b, and c need only be dropped from the main switching section 12 to arrive at FIG. 3.

The load 50', also labeled ZM in the figure, represents only the respective motor phase load as seen by the inverter. It is here noted that conventional representation of the load ZM being coupled between pole voltage VP and ½ source voltage Vs/2 is used in the figure. The Vs/2 reference corresponds essentially to the neutral connection in a conventional 'Y' connected stator winding.

With reference now to FIGS. 3, 4A–4D, 5A–5D and FIGS. 6A–6D, operation of the soft-commutated PWM inverter and control in accordance with the present invention is further explained. FIGS. 6A–6D represent the gating signals as applied to the various switching elements (auxiliary switch elements $AS_p$, $AS_n$; main switch elements $T_p$, $T_n$) in the inverter to bring about the resultant current and voltage responses as represented in FIGS. 4A–4D and 5A–5D. A high gating signal represents a 'command on' and a low gating signal represents a 'command off' of the corresponding switching element. FIGS. 4A–4D represent various current and voltage signals as they appear in portions of the auxiliary and main switch sections of the inverter during commutation from a positive main switch element $T_p$ to a negative main switch element $T_n$. Similarly, FIGS. 5A–5D represent various current and voltage signals as they appear in portions of the auxiliary and main switch sections of the inverter during commutation from a negative main switch element $T_n$ to a positive main switch element $T_p$.

Figure 4A:
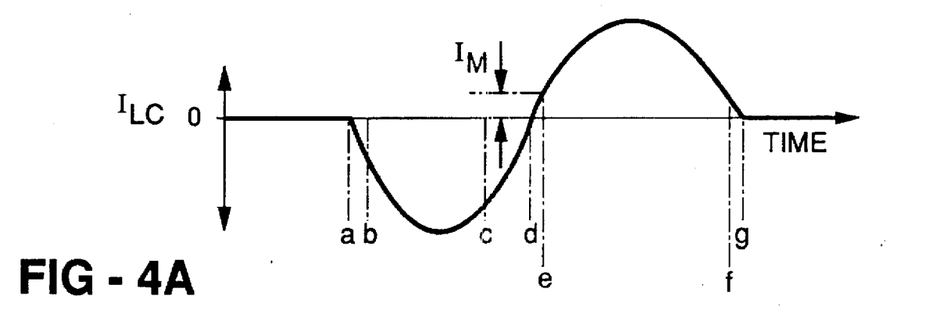
FIGS. 4A–4D illustrate various current and voltage signals during a soft-commutation from a positive main switch device to a negative main switch device.
Figure 4B:
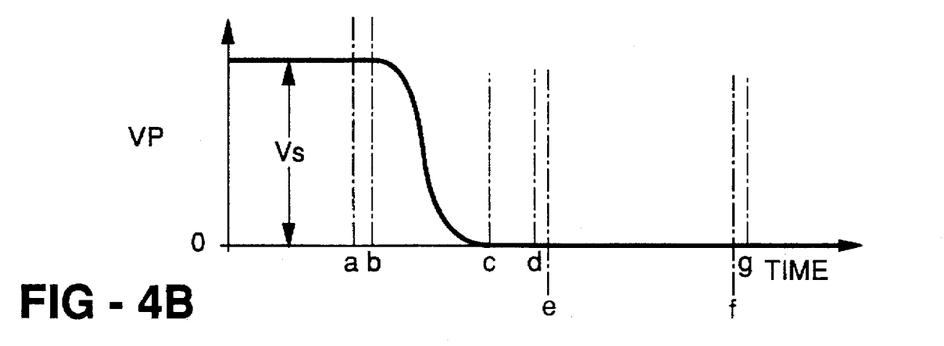
Figure 4C:
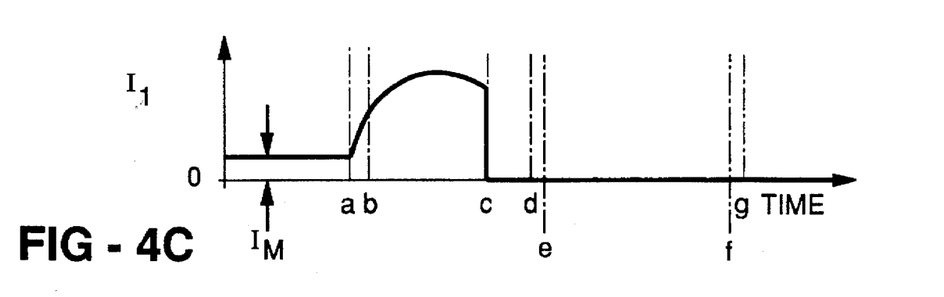
Figure 4D:
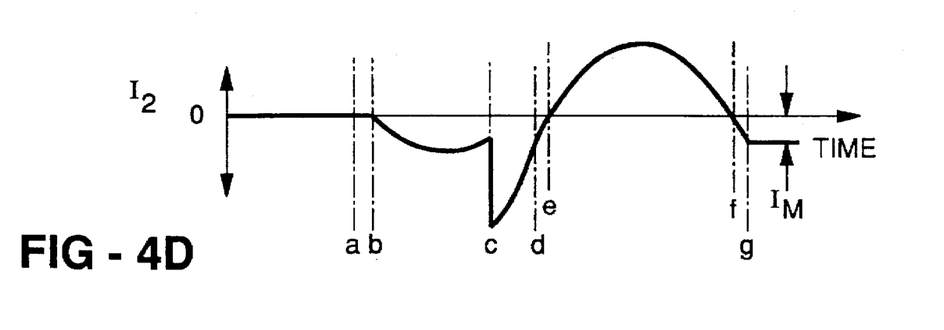

A soft-switched commutation interval from a positive main switch element $T_p$ to a negative main switch element $T_n$ is first discussed with reference to FIGS. 4A–4D and 6A–6D. FIG. 4A represents the series LC current $I_{LC}$ as shown in FIG. 3. FIG. 4B represents the pole voltage VP as it appears relative to the negative DC rail 13. FIGS. 4C and 4D represent the current components $I_1$ and $I_2$ as labeled in FIG. 3. Current components $I_1$ and $I_2$ correspond to the summation of all currents carried by upper ($T_p$, $D_p$ and $C_p$) and lower ($T_n$, $D_n$ and $C_n$) main switch components, respectively.

The motor phase current $I_M$, that is to say the current through the respective phase load ZM of motor 50, is for analysis purposes assumed to be constant through the commutation interval. It can be appreciated that with respect to most inverter driven load applications, such as rotary machines, all of the phase currents (motor phase currents $I_M a$, $I_M b$, $I_M c$ in the present embodiment) are considered to be substantially constant throughout any given commutation interval since such loads are characteristically inductive with time constants far in excess of any external power switching components. As will be appreciated from an examination of FIG. 3 and simple conventional nodal analysis thereof, the motor phase current $I_M$ is equivalent to the series LC current $I_{LC}$ plus current component $I_1$ less current component $I_2$ ($I_O = I_L + I_1 - I_2$). Motor phase current $I_m$ is not shown as a separate plot in FIGS. 4A–4D, however, it appears as appropriate as a portion of the various current components $I_M$, $I_{LC}$, $I_1$ and $I_2$ in further explanation.

Turning now to FIGS. 6A–6D, gating signals are shown which correspond to a soft-commutation interval. It can be seen that at an initial time toward the left of the axes of the respective graphs of gating signals that main switch element $T_p$ is the only one of any of the auxiliary or main switch elements that is currently commanded on as represented by the high signal in FIG. 6C. The voltage across main switch element $T_p$ therefore is substantially zero. Capacitor $C_p$ is discharged, both plates thereof being at substantially source voltage Vs. Capacitor $C_n$ is charged, the upper plate being at substantially source voltage Vs and the lower plate being at substantially the negative DC rail voltage. It is assumed that a steady state power delivery interval is in effect and therefore main switch element $T_p$ is conductive. This effectively DC couples the source voltage Vs to the pole of phase load ZM. The motor phase current $I_M$ delivered to the phase load ZM driven by the present inverter state is equivalent to $I_1$ as illustrated in FIG. 4C.

At a time (a), auxiliary switch $AS_n$ is commanded on thereby pulling down the one end of the series LC connected between the auxiliary switches $AS_p$, $AS_n$ to substantially negative DC rail voltage. Auxiliary switch $AS_n$ sinks the series LC current $I_{LC}$ as it increases negatively from zero as illustrated in FIG. 4A at an acceptably low sinusoidal rate. The series LC current $I_{LC}$ is sourced through main switch element $T_p$ and additively contributes to the current component $I_1$ which now comprises the motor phase current IM and the series LC current $I_{LC}$.

At a predetermined time (b), main switch element $T_p$ is commanded off. Since the main switch element $T_p$ is conductive when commanded off, the voltage thereacross is substantially zero.

The current and voltage responses to the gating sequence at times (a) and (b) of auxiliary switch $AS_n$ and main switch element $T_p$ results in the transfer of the current formerly carried as component $I_1$ through main switch element $T_p$ to capacitors $C_p$, $C_n$ as shown in FIGS. 4A–4D. The voltage rise across main switch element $T_p$ is still at an acceptably low dv/dt resulting from the current through capacitor $C_p$.

Continuing from time (b), after which the current $I_1$ formerly carried through main switch element $T_p$ is shunted through the capacitors $C_p$, $C_n$, the pole voltage VP swings toward the negative DC rail voltage as capacitor $C_n$ discharges and capacitor $C_p$ charges, while the series LC current $I_{LC}$ continues to increase negatively until it reaches a local negative maximum. The series LC current $I_{LC}$ is comprised of current components $I_1$ and $I_2$ less the motor phase current $I_M$ as illustrated in FIGS. 4C and 4D. As the current through the series LC decays from its peak, so too do the current components $I_1$ and $I_2$ decay therewith.

At time (c), the pole voltage VP attempts to overshoot the negative DC rail voltage thereby forward biasing diode $D_n$. This effectively clamps the pole voltage VP to substantially the negative DC rail voltage. Since the respective voltages across capacitors $C_p$, $C_n$ are no longer changing with time, the current through each drops to zero. The currents formerly carried by capacitors $C_p$, $C_n$ corresponding to current components $I_1$ and $I_2$ as shown in FIGS. 4C and 4D, respectively, are immediately picked up through diode $D_n$ as it is forward biased. This is shown in FIGS. 4C and 4D at time (c) whereat the current component $I_1$ drops to zero and is picked up through diode $D_n$ and appears in current component $I_2$. This current component $I_2$ is essentially comprised of the motor phase current $I_M$ and any remaining series LC current $I_{LC}$.

At a time substantially contemporaneous with or greater than time (c), wherein the diode $D_n$ is forward biased, the actual commutation of the main switch element $T_n$ may be accomplished at substantially zero voltage (one diode drop) thereacross and zero current. This commanding on of the main switch element $T_n$ can be observed in FIG. 6D at time (c). Time (c) is readily predicted based upon the known values of the reactive elements, predominantly the main device capacitors $C_p$, $C_n$.

At time (c), both ends of series LC are at substantially the negative DC rail voltage, each end being clamped thereto through the respective one of the auxiliary switch element $AS_n$ or the diode $D_n$. The natural resonance of the series LC continues to sinusoidally force to series LC current $L_{LC}$ therethrough toward zero. Therefore, the auxiliary switch $AS_n$ continues to conduct a freewheeling current therethrough until it reaches zero and reverses in accordance with the series LC resonance at time (d). Auxiliary diode $AD_n$ thereby becomes forward biased at time (d) and the sinusoidally increasing series LC current $I_{LC}$ increasingly sources the motor phase current $I_M$, thereby supplanting the current being delivered through diode $D_n$. When the series LC current resonates through the motor phase current $I_M$ at time (e), diode $D_n$ becomes reverse biased, and the portion of the series LC current in excess of the motor phase current $I_M$ freewheels back through the main switch element $T_n$.

At any time substantially contemporaneous with or greater than time (d), wherein the series LC current $I_{LC}$ has reversed and auxiliary diode $AD_n$ is forward biased, auxiliary switch element $AS_n$ is preferably commanded off to take advantage of the substantially zero voltage thereacross (one diode drop) and the zero current therethrough. This commanding off of the auxiliary switch element $AS_n$ can be observed in FIG. 6D at time (d).

Although commanding on of main switch element $T_n$ does not need to occur contemporaneously with the pole voltage VP reaching the negative DC rail voltage, it is necessary that it be commanded on while diode $D_n$ is forward biased (i.e. prior to series LC current $I_{LC}$ resonating through $I_M$) in order to maintain the objective of zero voltage/zero current switching thereof. This is shown to be time (c) through time (e) in FIG. 4D. Likewise, commanding off of auxiliary switch element $AS_n$ does not need to occur contemporaneously with the series LC current reversal, however, it is necessary that it be commanded off while auxiliary diode $AD_n$ is forward biased (i.e. series LC current greater than zero) in order to maintain the objective of zero voltage/zero current switching thereof. This is shown to be time (d) through time (g) in FIG. 4A.

Figures 5A, 5B:
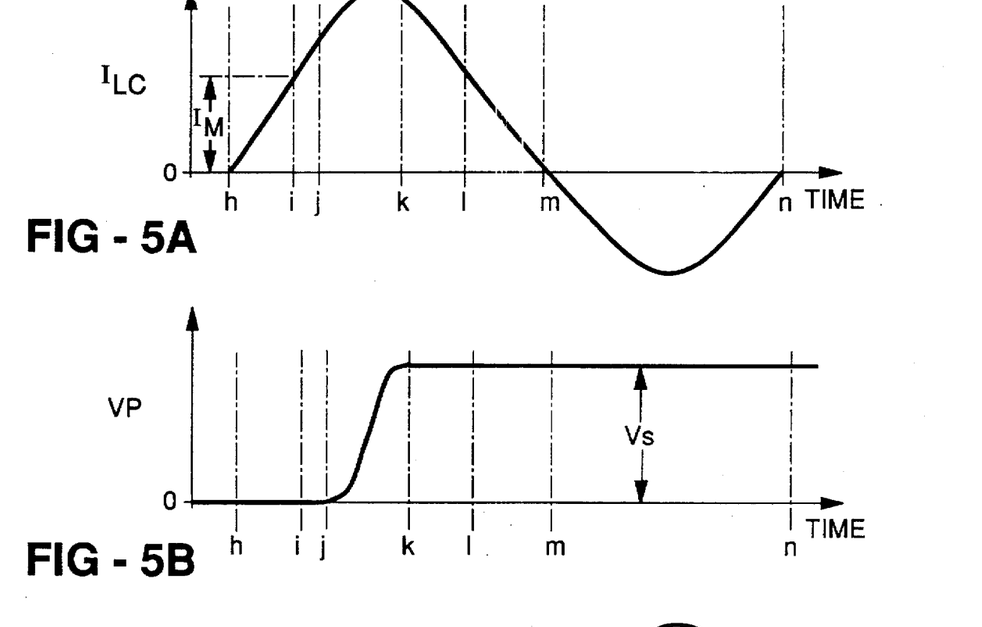
FIGS. 5A–5D illustrate various current and voltage signals during a soft-commutation from a negative main switch device to a positive main switch device.
Figure 5C:
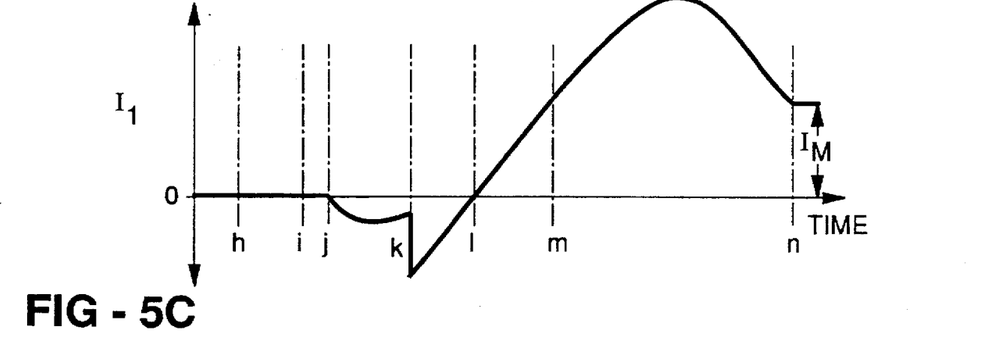
Figure 5D:
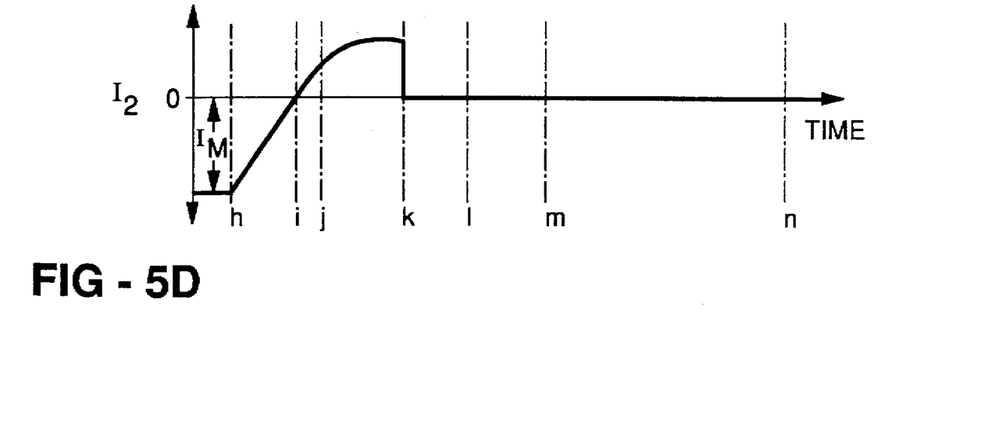
Figure 6A:
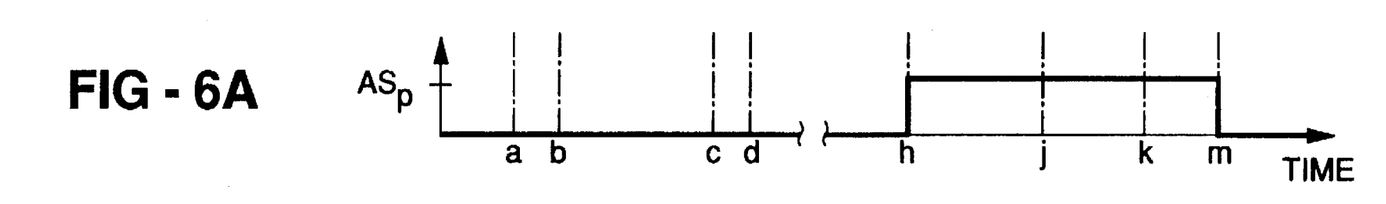
FIGS. 6A–6D illustrate various timing signals corresponding to the soft-commutation events illustrated in FIGS. 4A–4D and 5A–5D as applied to the various switch devices of a single inverter phase as illustrated in FIG. 3.
Figure 6B:
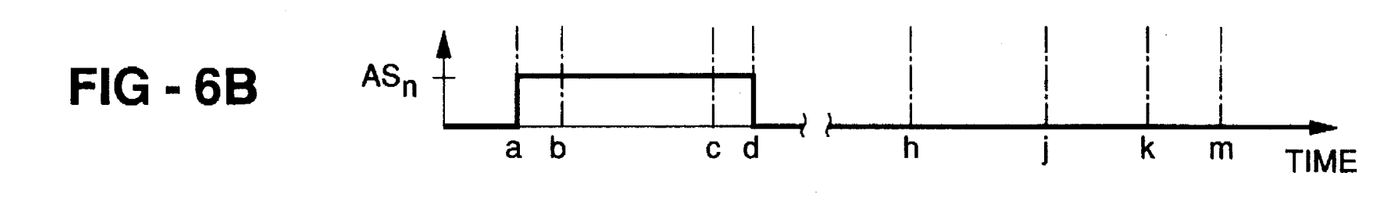
Figures 6C, 6D:
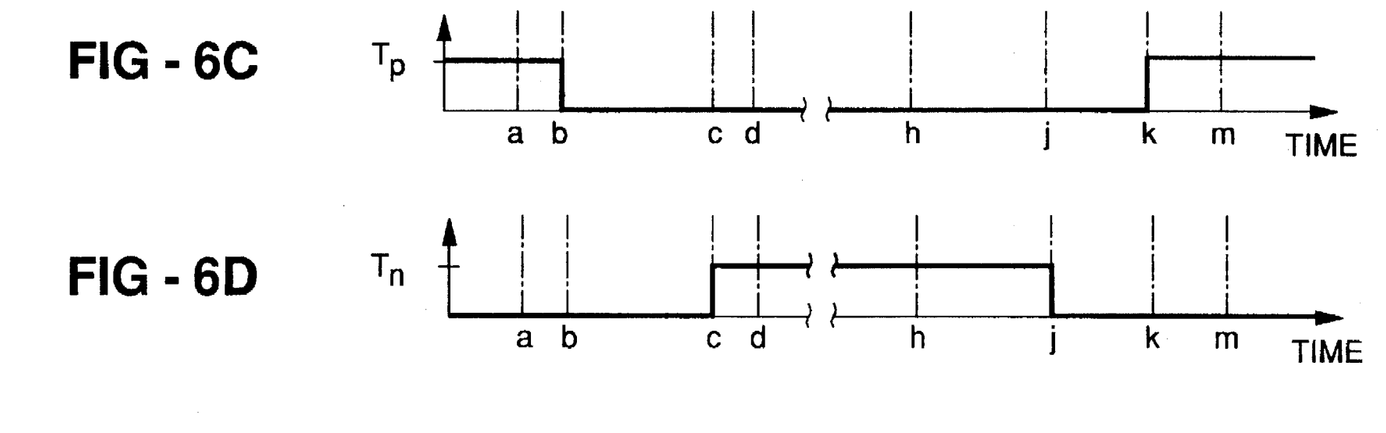

In performance of a commutation interval from a negative to a positive main switch element, $T_n$ to $T_p$, reference is made to FIGS. 5A–5D and FIGS. 6A–6D. Initially, the current component $I_2$ (through diode $D_n$) carries the entire motor phase current $I_M$ as illustrated in FIG. 5D. At a time (h), auxiliary switch element $AS_p$ is con, handed on thereby pulling up the one end of the series LC connected between the auxiliary switch elements $As_p$, $AS_n$ to substantially source voltage Vs.

Auxiliary switch $AS_p$ sources the series LC current $I_{LC}$ as it increases from zero as illustrated in FIG. 5A at an acceptably low sinusoidal rate, thereby increasingly supplanting the current contribution to the motor phase current $I_M$ carried through diode $D_n$. At a time (i), the current through series LC becomes equivalent to the motor phase current $I_M$ and the current component 12 is substantially zero. At this point, diode $D_n$ is no longer carrying any current and becomes reverse biased.

Passing through time (i), the series LC current $I_{LC}$ continues to increase sinusoidally, the main switch element $T_n$ sinking any current sourced through the series LC in excess of the motor phase current $I_M$ from time (i), whereat the diode $D_n$ becomes reverse biased, to time (j), whereat the main switch element $T_n$ is commanded off. The commanding off of main switch element $T_n$ occurs during substantially zero voltage thereacross.

At time (j), the current component $I_2$ formerly carried through main switch element $T_n$ is shunted through the capacitors $C_p$, $C_n$, and the pole voltage VP swings toward the positive DC rail voltage as capacitor $C_n$ charges and capacitor $C_p$ discharges. The voltage rise across main switch element $T_n$ occurs at an acceptably low dv/dt resulting from the current through capacitor $C_n$.

The series LC current $I_{LC}$ continues to increase positively until it reaches a local positive maximum above the summation of the motor phase current $I_M$. The series LC current $I_{LC}$ continues to source the motor phase current $I_M$ and current in excess thereof to the capacitors $C_p$, $C_n$ as illustrated in FIGS. 5A, 5C and 5D. As the current through the series LC resonates down from its peak, so too do the current components $I_1$ and $I_2$ decay therewith.

At time (k), the pole voltage VP attempts to overshoot the positive DC rail voltage thereby forward biasing diode $D_p$. This effectively clamps the pole voltage VP to substantially the positive DC rail voltage. Since the respective voltages across capacitors $C_p$, $C_n$ are no longer changing with time, the current through each drops to zero. The currents formerly carried by capacitors $C_p$, $C_n$ are immediately picked up through diode $D_p$ as it is forward biased. This is shown in FIGS. 5C and 5D at time (k) whereat the current component $I_2$ drops to zero and is picked up through diode $D_p$ and appears in current component $I_1$. This current component $I_1$ is essentially comprised of any remaining series LC current $I_{LC}$ in excess of the motor phase current $I_M$.

The series LC current $I_{LC}$ continues to source the motor phase current $I_M$ with any current in excess thereof freewheeling back through the diode $D_p$. At a time substantially contemporaneous with or greater than time(k), wherein the pole voltage is clamped at source voltage and diode $D_p$ is forward biased, main switch element $T_p$ is preferably commanded on to take advantage of the substantially zero voltage thereacross (one diode drop) and the zero current therethrough. This commanding on of the main switch element $T_p$ can be observed in FIG. 6D at time (k).

The series LC current eventually resonates below the motor phase current $I_M$ at time (1), and the diode $D_p$ becomes reverse biased. Main switch element $T_p$ therefore becomes conductive and increasingly sources the motor phase current IM as the series LC current $I_{LC}$ continues to resonate toward zero. The series LC current ultimately resonates through zero at time (m) thereby reversing and freewheeling through main switch element $T_p$ and auxiliary diode $AD_p$ until it resonates once again to zero. Auxiliary switch $AS_p$ is commanded off within the freewheel time (m–n), forward biased auxiliary diode $AD_p$ thereby providing soft switching of auxiliary switch $AS_p$ at substantially zero voltage/current conditions. This commanding off of auxiliary element $AS_p$ can be observed in FIG. 6D at time (m).

Although commanding on of main switch element $T_p$ does not need to occur contemporaneously with the pole voltage VP reaching the positive DC rail voltage, it is necessary that it be commanded on while diode $D_p$ is forward biased (i.e. prior to series LC current $I_{LC}$ resonating through $I_M$) in order to maintain the objective of zero voltage/zero current switching thereof. This is shown to be time (k) through time (l) in FIG. 5C. Likewise, commanding off of auxiliary switch $AS_p$ does not need to occur contemporaneously with the series LC current reversal, however, it is necessary that it be commanded off while auxiliary diode $AD_p$ is forward biased (i.e. series LC current less than zero) in order to maintain the objective of zero voltage/zero current switching thereof. This is shown to be time (m) through time (n) in FIG. 5A.

It is noted here that the series LC is required to carry a current in excess of the motor phase current $I_M$ for a finite amount of time. However, this time is extremely small in comparison to the time in which the motor phase current $I_M$ is carried by the main switch element $T_p$ and presents overall minimal energy dissipation through any commutation interval. Therefore, the series LC may be selected suitably for transient current delivery.

The gate timing signals as illustrated in FIGS. 6A–6D may vary in accordance with the operating parameters, in particularly motor current. for example, if the time labeled (c) corresponding to the commanding on of the main switch element $T_n$ is to occur when the diode $D_n$ is forward biased, then the charging and discharging of the capacitors $C_p$ and $C_n$, respectively, must be complete. The timing of the gate signal for the auxiliary switch element $As_n$, therefore, may require advancement at low motor currents to ensure timely completion of the charging and discharging of the capacitors $C_p$ and $C_n$. Similarly, if the time labeled (k) corresponding to the commanding on of the main switch element $T_p$ is to occur when the diode $D_p$ is forward biased, then the charging and discharging of the capacitors $C_n$ and $C_p$, respectively, must be complete. The timing of the gate signal for the auxiliary switch element $As_p$, therefore, may require advancement at low motor currents to ensure timely completion of the charging and discharging of the capacitors $C_n$ and $C_p$.

While the invention has been described with respect to certain preferred embodiments, such embodiments are to be taken by way of example and not of limitation. Therefore, the scope of the invention is to be limited only by the claims as presented herein.

We claim:

1. A soft-switched, multi-phase, quasi-resonant pole inverter comprising:

a DC source including a positive DC rail at a first voltage and a negative DC rail at a second voltage, a multi-phase main switching section including a plurality of phase-pairs of main switch devices between said positive and negative DC rails, each one of said plurality of phase-pairs of main switch devices including an upper and a lower main switch device and a respective main phase-pole therebetween, an auxiliary switching section including one pair of auxiliary switch devices between said positive and negative DC rails including an upper and a lower auxiliary switch device and an auxiliary pole therebetween, and a plurality of series combined inductor and capacitor pairs, each one of said plurality of series combined inductor and capacitor pairs coupled between the auxiliary pole and a respective one of said main phase-poles.

2. A soft-switched, multi-phase, quasi-resonant pole inverter as claimed in claim 1 wherein each upper and lower main switch device includes a respective solid state main switch and each upper and lower auxiliary switch device including a respective solid state auxiliary switch, each main and auxiliary switch having a respective anti-parallel diode coupled thereacross, each main switch further having a capacitor coupled thereacross, said inverter further comprising a control for executing a quasi-resonant cycle of a predetermined main phase-pole by sequentially commanding on the lower auxiliary switch to catalyze a swing of the predetermined main phase-pole to the negative DC rail voltage, commanding off the upper main switch corresponding to the predetermined main phase-pole to release the predetermined main phase-pole from the positive DC rail voltage to thereby swing the predetermined main phase-pole to the negative DC rail voltage, commanding on the lower main switch corresponding to the predetermined main phase-pole while the respective anti-parallel diode is forward biased, commanding off the lower auxiliary switch while the respective anti-parallel diode is forward biased, commanding on the upper auxiliary switch to catalyze a swing of the predetermined main phase-pole to the positive DC rail voltage, commanding off the lower main switch corresponding to the predetermined main phase-pole to release the predetermined main phase-pole from the negative DC rail voltage to thereby swing the predetermined main phase-pole from the negative DC rail voltage to the positive DC rail voltage, commanding on the upper main switch while the respective anti-parallel diode is forward biased, and commanding off the upper auxiliary switch corresponding to the predetermined main phase-pole while the respective anti-parallel diode is forward biased.

3. A method of executing a quasi-resonant cycle of a predetermined main phase-pole of a quasi-resonant pole inverter having a DC source including a positive DC rail and a negative DC rail, a multi-phase main switching section including a plurality of phase-pairs of main switch devices between said positive and negative DC rails, each one of said plurality of phase-pairs of main switch devices including a respective main phase-pole between an upper and a lower solid state main switch, each main switch having a respective anti-parallel diode and capacitor coupled thereacross, an auxiliary switching section including one pair of auxiliary switch devices between said positive and negative DC rails including an auxiliary pole between an upper and a lower solid state auxiliary switch, each auxiliary switch having a respective anti-parallel diode coupled thereacross, and a plurality of series combined inductor and capacitor pairs, each one of said plurality of series combined inductor and capacitor pairs coupled between the auxiliary pole and a respective one of said main phase-poles, the method comprising the steps of:

commanding on the lower auxiliary switch to catalyze a swing of the predetermined main phase-pole to the negative DC rail voltage, commanding off the upper main switch corresponding to the predetermined main phase-pole to release the predetermined main phase-pole from the positive DC rail voltage to thereby swing the predetermined main phase-pole to the negative DC rail voltage, commanding on the lower main switch corresponding to the predetermined main phase-pole while the respective anti-parallel diode is forward biased, commanding off the lower auxiliary switch while the respective anti-parallel diode is forward biased, commanding on the upper auxiliary switch to catalyze a swing of the predetermined main phase-pole to the positive DC rail voltage, commanding off the lower main switch corresponding to the predetermined main phase-pole to release the predetermined main phase-pole from the negative DC rail voltage to thereby swing the predetermined main phase-pole from the negative DC rail voltage to the positive DC rail voltage, commanding on the upper main switch corresponding to the predetermined main phase-pole while the respective anti-parallel diode is forward biased, and commanding off the upper auxiliary switch while the respective anti-parallel diode is forward biased.

4. A soft-switched, multi-phase, quasi-resonant pole inverter comprising:

a DC source including a positive DC rail at a first voltage and a negative DC rail at a second voltage, a multi-phase main switching section including a plurality of phase-pairs of main switch devices between said positive and negative DC rails, each one of said plurality of phase-pairs of main switch devices including an upper and a lower main switch device and a respective main phase-pole therebetween, an auxiliary switching section including a plurality of phase-pairs of auxiliary switch devices between said positive and negative DC rails, each one of said plurality of phase-pairs of auxiliary switch devices including an upper and a lower auxiliary switch device and a respective auxiliary phase-pole therebetween, and a plurality of series combined inductor and capacitor pairs, each one of said plurality of series combined inductor and capacitor pairs coupled between a respective one of said auxiliary phase-poles and a respective one of said main phase-poles.

5. A soft-switched, multi-phase, quasi-resonant pole inverter as claimed in claim 4 wherein each upper and lower main switch device includes a respective solid state main switch and each upper and lower auxiliary switch device includes a respective solid state auxiliary switch, each main and auxiliary switch having a respective anti-parallel diode coupled thereacross, each main switch further having a capacitor coupled thereacross, said inverter further comprising a control for executing a quasi-resonant cycle of a predetermined phase-pole by sequentially commanding on the lower auxiliary switch to catalyze a swing of the predetermined main phase-pole to the negative DC rail voltage, commanding off the upper main switch corresponding to the predetermined main phase-pole to release the predetermined main phase-pole from the positive DC rail voltage to thereby swing the predetermined main phase-pole to the negative DC rail voltage, commanding on the lower main switch corresponding to the predetermined main phase-pole while the respective anti-parallel diode is forward biased, commanding off the lower auxiliary switch while the respective anti-parallel diode is forward biased, commanding on the upper auxiliary switch to catalyze a swing of the predetermined main phase-pole to the positive DC rail voltage, commanding off the lower main switch corresponding to the predetermined main phase-pole to release the predetermined main phase-pole from the negative DC rail voltage to thereby swing the predetermined main phase-pole from the negative DC rail voltage to the positive DC rail voltage, commanding on the upper main switch while the respective anti-parallel diode is forward biased, and commanding off the upper auxiliary switch corresponding to the predetermined main phase-pole while the respective anti-parallel diode is forward biased.

6. A method of executing a quasi-resonant cycle of a predetermined main phase-pole of a quasi-resonant pole inverter having a DC source including a positive DC rail and a negative DC rail, a multi-phase main switching section including a plurality of phase-pairs of main switch devices between said positive and negative DC rails, each one of said plurality of phase-pairs of main switch devices including a respective main phase-pole between an upper and a lower solid state main switch, each main switch having a respective anti-parallel diode and capacitor coupled thereacross, an auxiliary switching section including a plurality of phase-pairs of auxiliary switch devices between said positive and negative DC rails, each one of said plurality of phase-pairs of auxiliary devices including a respective auxiliary phase-pole between an upper and a lower solid state auxiliary switch, each auxiliary switch having a respective anti-parallel diode coupled thereacross, and a plurality of series combined inductor and capacitor pairs, each one of said plurality of series combined inductor and capacitor pairs coupled between the auxiliary phase-pole and a respective one of said main phase-poles, the method comprising the steps of:

commanding on the lower auxiliary switch to catalyze a swing of the predetermined main phase-pole to the negative DC rail voltage, commanding off the upper main switch corresponding to the predetermined main phase-pole to release the predetermined main phase-pole from the positive DC rail voltage to thereby swing the predetermined main phase-pole to the negative DC rail voltage, commanding on the lower main switch corresponding to the predetermined main phase-pole while the respective anti-parallel diode is forward biased, commanding off the lower auxiliary switch while the respective anti-parallel diode is forward biased, commanding on the upper auxiliary switch to catalyze a swing of the predetermined main phase-pole to the positive DC rail voltage, commanding off the lower main switch corresponding to the predetermined main phase-pole to release the predetermined main phase-pole from the negative DC rail voltage to thereby swing the predetermined main phase-pole from the negative DC rail voltage to the positive DC rail voltage, commanding on the upper main switch corresponding to the predetermined main phase-pole while the respective anti-parallel diode is forward biased, and commanding off the upper auxiliary switch while the respective anti-parallel diode is forward biased.

* * * * *